Patented Feb. 2, 1932

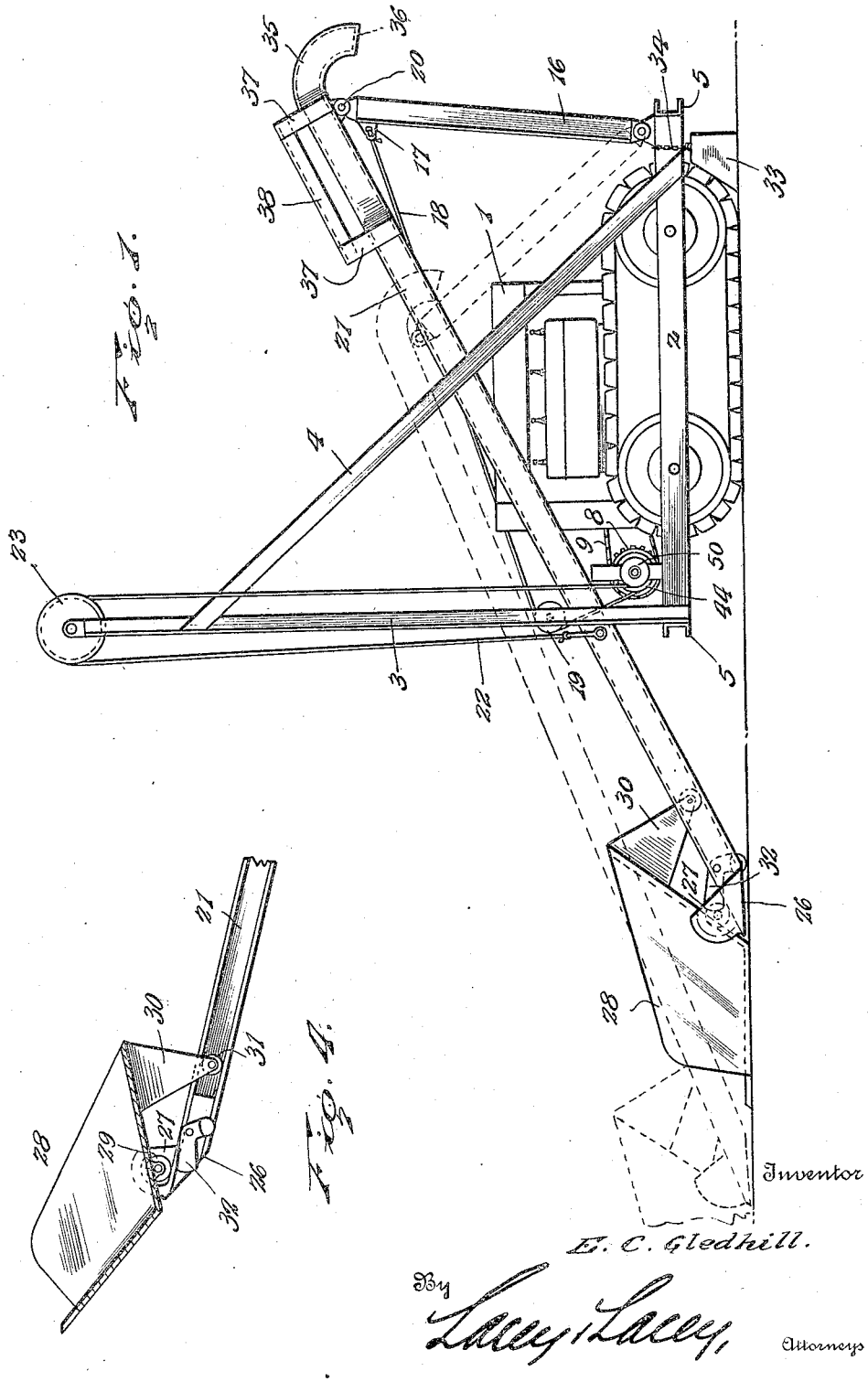

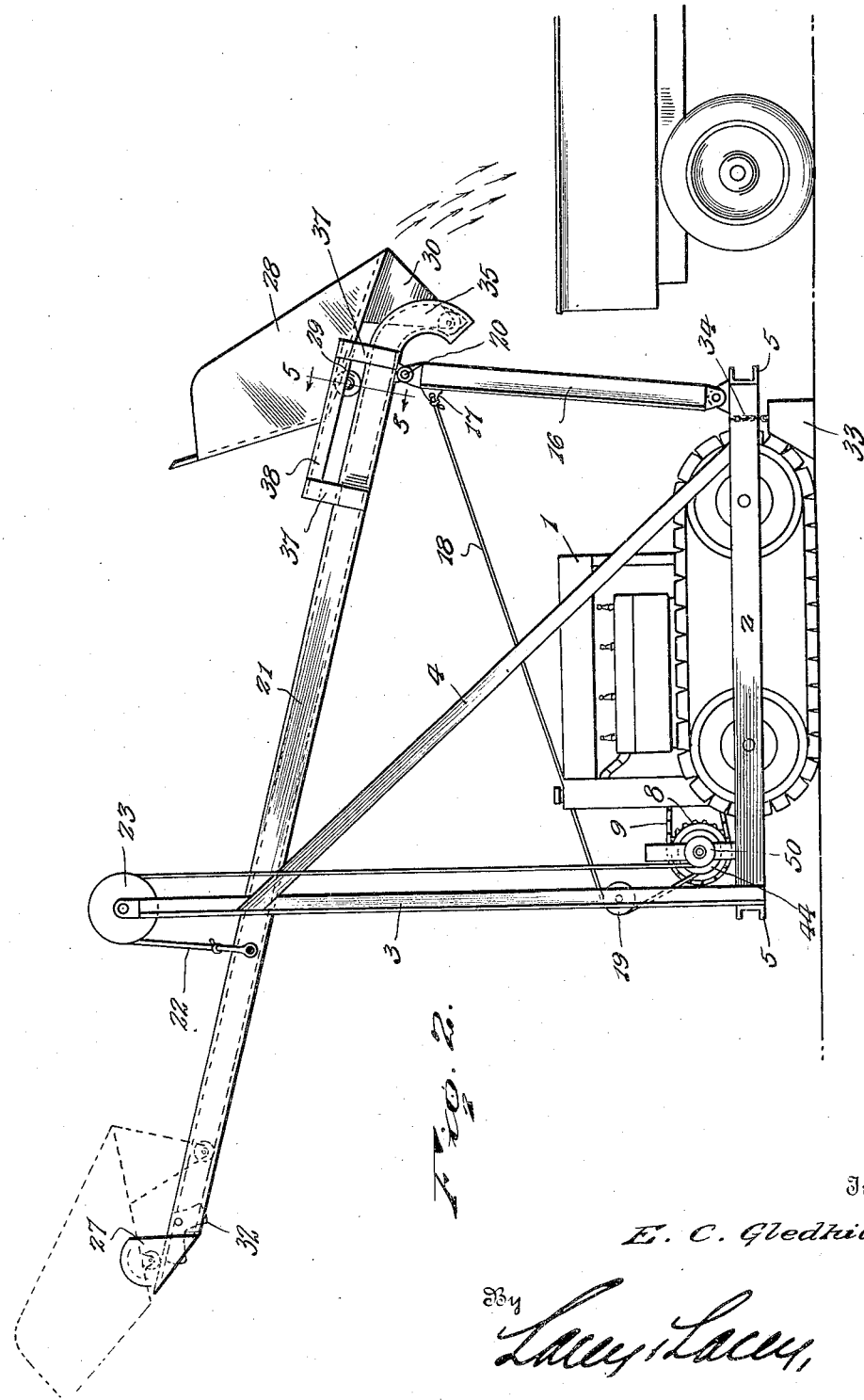

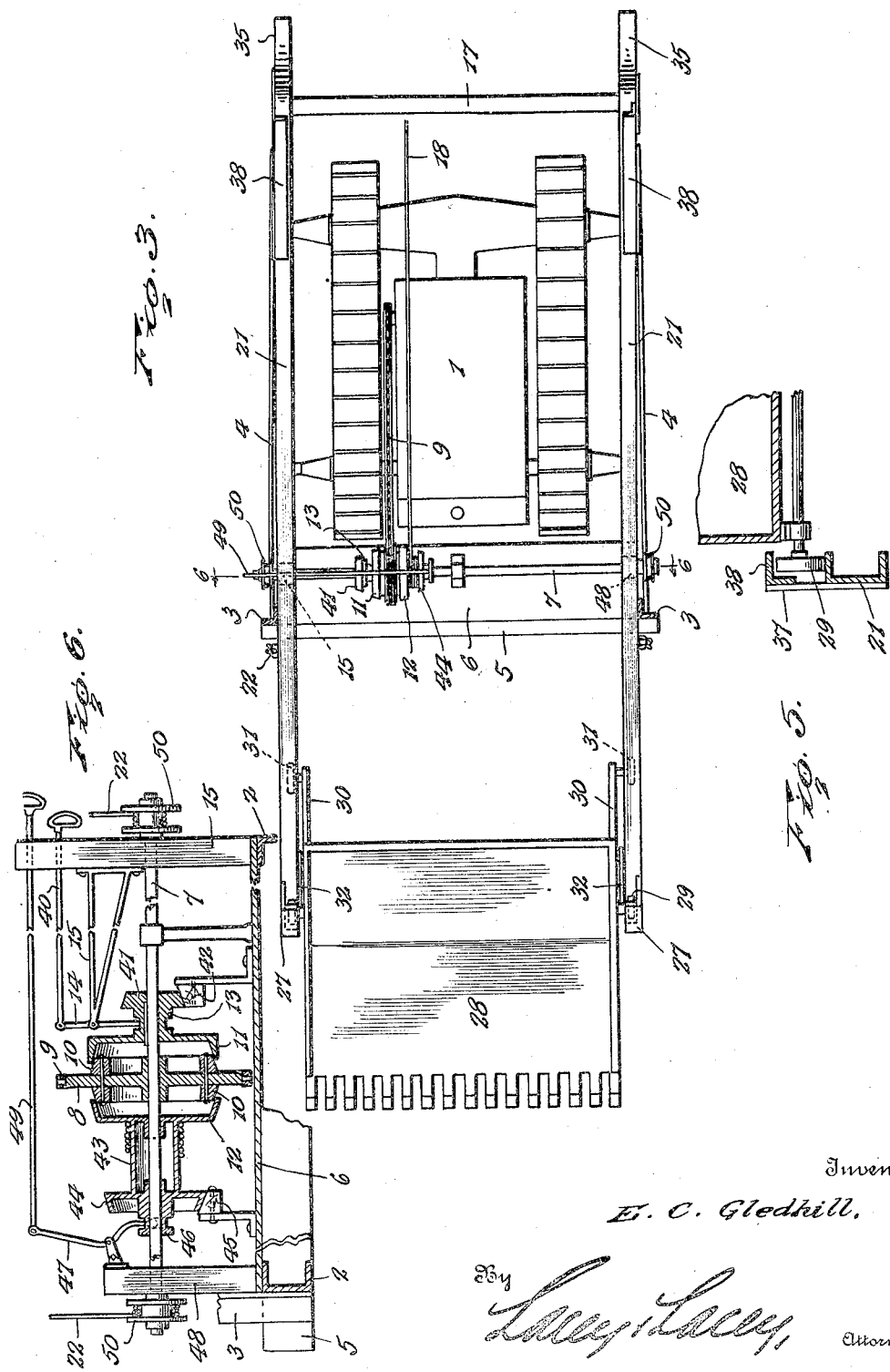

1,843,508

UNITED STATES PATENT OFFICE

EDWARD C. GLEDHILL, OF GALION, OHIO

LOADER

Application filed November 18, 1930. Serial No. 496,467.

The object of this invention is to provide a light and inexpensive but efficient mechanism which may be mounted upon a tractor or motor truck and operated to transfer loose material from a pile to a wagon or other conveyance for transportation to a point of use. Another object of the invention is to provide an apparatus for the stated purpose which will be approximately automatic in its operation and will require only such manipulation by the attendant as may be necessary to insure the movement of the working parts in the proper direction. A mechanism embodying the invention is illustrated in the accompanying drawings and will be hereinafter fully described, the novel features being subsequently particularly defined in the appended claims.

In the accompanying drawings:

Figure 1 is a side elevation of an apparatus embodying the invention, the shovel or scoop being shown upon the ground, Fig. 2 is a similar view showing the shovel or scoop in its raised and dumping positions, Fig. 3 is a plan view, Fig. 4 is a detail section taken longitudinally of the shovel or scoop, Fig. 5 is an enlarged detail section on the line 5—5 of Fig. 2, and Fig. 6 is an enlarged detail section on the line 6—6 of Fig. 3.

The reference numeral 1 indicates a tractor which may be of any known or approved form and upon which is mounted a main frame 2 consisting of side bars or beams, which are carried by the axles of the tractor wheels or tread mechanism. At the front end of the main frame are erected standards or posts 3 which are braced in position by diagonal bracing bars 4 secured rigidly to the respective posts at their upper ends and at their lower ends to the side members of the main frame. The side bars or beams of the main frame are connected by cross bars 5 disposed at the front and the rear of the tractor so that a very rigid strong frame is attained, the engine of the tractor being disposed between the side bars of the frame and a platform 6 being carried by the front cross bar 5 and a cross bar just to the rear of the front bar and in advance of the engine and the traction elements. In suitable bearings upon the platform is mounted a shaft 7 which is operatively connected with the driving shaft of the engine so as to be rotated thereby, the drawings showing a sprocket wheel 8 loose on the shaft and connected with the power take-off of the motor by a chain 9. Fixed on the opposite faces of the sprocket 8 are friction clutch bands 10 and clutch drums 11 and 12 are arranged to cooperate with said bands. The drum 11 is fixed to a hub 13 which is splined upon the shaft 7 and provided with an annular groove in which is engaged the forked lower end of a lever 14 which is fulcrumed on a suitable supporting frame 15 erected on the platform 6, a handle member 40 being connected to the upper end of said lever and extending to the side of the machine. At its end remote from the clutch drum 11, the hub 13 is provided with a brake flange or drum 41 and adjacent said drum a rigid brake block 42 is secured upon the platform to be engaged by the brake drum when rotation of the drum is not desired. It will now be understood that by shifting the handle member 40 endwise the lever 14 will be rocked and the hub 13 will be moved longitudinally upon the shaft 7. When moved in one direction, the drum 41 will be engaged with the brake block 42 and the shaft 7 will be held against rotation. When the movement is in the opposite direction, the brake drum is freed from the brake block and the clutch drum 11 is engaged with the clutch band 10 whereupon rotation is imparted to the shaft. The hub may be set in an intermediate neutral position in which neither the clutch band nor the brake block will be engaged.

The clutch drum 12 is fixed to or formed on one end of a winding drum 43 which is loosely mounted on the shaft 7 and is equipped at its opposite end with a brake drum 44 adapted to at times engage the stationary brake block 45 corresponding to the brake block 42. Extending from the brake drum 44 is a hub 46 having an annular groove in which is engaged the forked lower end of a lever 47 fulcrumed on the post 48, a handle member 49 being connected to the upper end of said lever and extending through the frame 15 above the handle member 40. It will be seen that the winding drum 43 may be shifted so as to be held against rotation by engagement of the members 44 and 45 or be caused to rotate through engagement of the members 10 and 12, and the drum may or may not rotate simultaneously with the shaft 7 as may be desired.

At the rear end of the main frame are pivotally mounted posts or standards 16 which are connected near or at their upper ends by a cross bar 17 to which is attached one end of a cable 18 which extends forwardly and downwardly therefrom to an idler 19 supported by the front standards 3, the cable passing from said idler to the drum 43 to which it is secured and upon which it is adapted to wind. Pivotally secured to the upper ends of the standards 16, as shown at 20, are walking beams or lever arms 21 which, as will be understood upon reference to Figs. 4 and 5, are channel bars having their channels upon their inner sides. These arms 21 extend forwardly above the main frame and between and beyond the front standards 3 and near their front ends have cables 22 secured thereto. Said cables extend upwardly from the arms 21 and pass over guide pulleys 23 at the upper ends of the standards 3 and then pass downwardly to be secured to and wind upon the drums 50 secured upon the ends of the shaft 7. It will be understood that if the clutch 10, 11 be open, the cables 22 may unwind so that the weight of the arms 21 will lower the same to the ground, as shown by full lines in Fig. 1, and if said clutch be closed, the cable will be wound so that the lever arms 21 will be raised to the position shown in Fig. 2. Likewise, if the clutch 10, 12 be closed, the cable 18 will be wound so as to pull the rocking standards or posts 16 forward to the dotted line position shown in Fig. 1, and if said cable 18 be left free, the posts will return to the position shown in full lines as the arms 21 are raised to the position shown in Fig. 2.

At the front extremities of the levers 21, which are beveled on their under sides, as shown at 26, are brackets 27 which serve as stops to limit the forward and downward movement of the bucket or scoop 28 which is arranged to travel upon the arms 21. The bucket or scoop may be of any preferred material and has its bottom and back preferably formed integrally and defining an obtuse angle so that the bucket may rest flat upon the ground adjacent a pipe of material and the back will extend upwardly and rearwardly therefrom. The bucket is provided on its back near its bottom with rollers 29 adapted to run upon the tops of the respective arms 21 and near the top edge of the back are brackets 30 which extend rearwardly and somewhat downwardly with respect to the back and are equipped at their extremities with rollers 31 which are adapted to run within the channels of the arms 21, as will be understood upon reference to Fig. 4. The arms 21 are equipped at or near their front extremities with gravity latches 32 adapted to extend up in rear of the rollers 29 and engage the same to prevent premature rearward movement of the bucket or scoop. As shown most clearly in Fig. 4, these latches may conveniently be angle levers pivoted at their angles upon the arms 21 and having one arm extending toward the ends of the arms 21 and the other arm or branch normally extending downwardly and being weighted so as to overbalance the forwardly extending arm. When the scoop or shovel 28 moves downwardly upon the arms 21, the rollers 29 will ride over the forward arms of the latches and assume positions in front of the same, the travel being limited by the stops 27 in an obvious manner. The latches will automatically assume the position shown in Fig. 1 with their forward ends abutting the axles of the respectively adjacent rollers 29 so that the relative rearward movement of the shovel or scoop during the act of taking up a load will be resisted. To further resist backward movement of the apparatus in taking up a load, a chock block 33 is suspended upon the main frame on each side thereof at the rear end to rest upon the ground immediately at the rear of the traction elements. These chock blocks are preferably suspended by chains 34 so that they will yield to and not resist forward movement of the machine but upon the machine tending to move backwardly will bind between the surface of the ground and the surface of the traction element so that the machine will be anchored at the point of operation.

The rear extremity of each swinging arm 21 is curved downwardly, as shown at 35, a cross web, indicated at 36, extending across the extremity of each arm. In advance of the arcuate end portion vertically extending straps 37 are secured to the outer side of each lever arm and secured to and carried by the upper ends of these straps is an angle bar 38 which constitutes a guard to hold the corresponding roller 29 upon the track, as will be understood upon reference to Fig. 5.

It is thought the operation will be readily understood from the foregoing description, taken in connection with the accompanying drawings. If both clutches be open and the engine clutch and transmission be adjusted to impart travel to the machine but be disconnected from the shaft 7, the machine may be driven to a point adjacent the pile of material which is to be loaded and during such travel the arms 21 will be held above the ground so that there will be no unnecessary wear upon the shovel or scoop. Having reached the proper point adjacent the material, the transmission of the engine is put in neutral and the clutch controlling the cable 18 is closed, whereupon said cable will be wound and will exert a forward pull upon the posts 16 as is obvious. The forward movement of the posts will be transmitted to the lever arms 21 and the scoop will be caused to slide over the surface of the ground and penetrate the pile of material, as will be understood upon reference to the full and dotted lines in Fig. 1. When the shovel or scoop has taken up a load, the cable 18 is permitted to slacken and the clutch controlling the cables 22 is closed, whereupon said cables 22 will be wound and will exert a lifting pull upon the lever arms 21 to raise the same, as shown in Fig. 2. As said arms 21 pass above a horizontal plane, the latches 32 will be swung by the force of gravity to the position shown in Figs. 2 and 4, thereby freeing the scoop which will thereupon ride down along the inclined lever arms 21 until its movement is arrested by the rollers 31 passing around the curved extremities of the tracks defined by said arms and abutting the webs 36, the scoop being thus tilted to the position shown in full lines in Fig. 2 and causing its contents to discharge into a wagon or other conveyance placed to receive the same.

It will thus be seen that I have provided a very simple and light loader which may be built and maintained at a low cost and which will operate very efficiently. The only work required of the operator is to guide the tractor or motor truck to the point of operation and to manipulate the levers 14 and 47 so as to properly open and close the clutches as demanded by the stage of operations. When the shovel has discharged a load, the cables 22 are slackened and the weight of the arms 21 will then cause the same to move downwardly. As the arms pass below the horizontal, the shovel will roll by gravity to the front lower ends of the arms and reassume the position shown in full lines in Fig. 1, ready for another operation. It will be noted that the force applied to the arms 21 for shoving the scoop or shovel into the pile of material is applied in such direction that the shovel will be held to the ground as it moves forwardly.

Having thus described the invention, I claim:

1. A loading mechanism comprising a traveling frame, rocking standards mounted upon said frame, lever arms pivotally connected to the upper ends of said standards and extending forwardly therefrom, a scoop mounted to travel from end to end of said lever arms, means for swinging the rocking standards forwardly whereby to push the scoop under material to be taken up, and means for raising and lowering the lever arms.

2. A loading mechanism comprising a portable frame, standards mounted on the frame, lever arms carried by and extending forwardly from said standards, means for rocking the standards whereby to effect travel of the front ends of the lever arms over the ground, means for raising and lowering the lever arms, a scoop mounted to travel along the lever arms, means at the forward ends of the lever arms to prevent relative movement of the scoop, said means releasing the scoop as the lever arms are raised, and means at the rear ends of the lever arms to tilt the scoop and arrest the movement thereof whereby to discharge its contents.

3. A loading mechanism comprising a portable frame, standards on said frame, lever arms connected to and extending forwardly from said standards, means for rocking the standards to cause the lever arms to travel over the ground, means for raising and lowering the lever arms, a scoop mounted on the lever arms to travel from end to end of the same, the rear ends of the lever arms being curved downwardly, stops at the front ends of said arms to arrest forward movement of the scoop, gravity latches adjacent said stops to yieldably hold the scoop at the forward ends of the arms, means on the scoop to follow the curved rear extremities of the arms and effect pivotal tilting of the scoop, and guards adjacent the curved rear extremities of the arms to retain the tilted scoop on the lever arms.

4. A loading mechanism comprising a portable frame, standards on said frame, lever arms carried by said standards and extending forwardly therefrom, means for moving the arms forwardly, upwardly and downwardly, said arms consisting of channeled bars having their channels disposed inwardly and having their rear ends curved downwardly and closed, a scoop provided on its back near its bottom with rollers to travel on the tops of said arms and provided on its back near its top with rollers to travel in the channels of said arms, stops at the front ends of the arms to arrest the forward movement of the scoop, latches adjacent the forward ends of the arms to yieldably hold the scoop at the front ends of the arms, and guards on said arms adjacent the rear ends of the same to pass over the lower rollers on the scoop and hold the scoop to said arms in its tilted position.

5. A loading mechanism comprising a portable frame, standards on said frame, lever arms connected to and extending forwardly from the standards, the rear ends of said arms being turned downwardly, a scoop mounted to travel from end to end of the lever arms, stops at the ends of the arms to arrest the movement of the scoop, gravity operated latches consisting of angle levers pivoted at their angles on the arms to engage behind the scoop and hold it at the front ends of the arms, said latches releasing the scoop as the arms are raised, means for rocking the standards to push the scoop under material to be taken up, means to raise and lower the arms, and means on the arms adjacent the rear ends thereof to retain the tilted scoop thereon.

6. A loading mechanism comprising a portable frame, standards on said frame, lever arms connected to and extending forwardly from the standards, the rear ends of the arms being turned downwardly, a scoop, rollers on the back of the scoop near the bottom thereof to travel on the tops of the arms, brackets on the back of the scoop near the top thereof, rollers carried by said brackets to travel on the sides of the lever arms, stops at the ends of the arms to arrest travel of the scoop, yieldable means for holding the scoop against relative movement at the front ends of the arms, means for rocking the standards whereby to push the scoop under material to be taken up, means for raising and lowering the lever arms, and guards mounted on and disposed above the lever arms at the rear ends of the same under which the lower rollers on the scoop pass to retain the tilted scoop on the arms.

In testimony whereof I affix my signature.

EDWARD C. GLEDHILL. [L. S.]